United States Patent
Filsfils et al.

(10) Patent No.: US 11,012,350 B2
(45) Date of Patent: May 18, 2021

(54) NETWORK INTERWORKING WITH NO CROSS-DOMAIN STATE

(71) Applicant: Cisco Technology, Inc., San Jose, CA (US)

(72) Inventors: Clarence Filsfils, Brussels (BE); Pablo Camarillo Garvia, Madrid (ES); Francois Clad, Strasbourg (FR); Swadesh Agrawal, San Jose, CA (US); Zafar Ali, Hicksville, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/513,379

(22) Filed: Jul. 16, 2019

(65) Prior Publication Data

US 2021/0021513 A1    Jan. 21, 2021

(51) Int. Cl.
*H04L 12/723*   (2013.01)
*H04L 12/715*   (2013.01)
*H04L 12/46*    (2006.01)
*H04L 12/749*   (2013.01)
*H04L 12/721*   (2013.01)

(52) U.S. Cl.
CPC ............ *H04L 45/50* (2013.01); *H04L 12/46* (2013.01); *H04L 45/04* (2013.01); *H04L 45/741* (2013.01); *H04L 45/12* (2013.01)

(58) Field of Classification Search
CPC ......... H04L 45/50; H04L 45/04; H04L 12/46; H04L 45/741; H04L 45/12
See application file for complete search history.

(56) References Cited

U.S. PATENT DOCUMENTS

| | | | |
|---|---|---|---|
| 2017/0346737 A1* | 11/2017 | Previdi | H04L 69/22 |
| 2019/0190818 A1* | 6/2019 | Ceccarelli | H04L 45/42 |
| 2020/0213223 A1* | 7/2020 | Peng | H04L 12/4633 |

FOREIGN PATENT DOCUMENTS

WO    WO-2020029976 A1 *   2/2020   ............. H04L 12/46

OTHER PUBLICATIONS

Filsfils et al., Segment Routing Architecture, draft-ietf-spring-segment-routing-14, Dec. 20, 2017. (Year: 2017).*

* cited by examiner

*Primary Examiner* — Shailendra Kumar
(74) *Attorney, Agent, or Firm* — Merchant & Gould P.C.

(57) ABSTRACT

Network interworking with no cross-domain state may be provided. First, an edge node may receive a packet from an intermediate node in a first domain. The edge node may be between the first domain and a second domain. Next, the edge node may pop, in response to a first Service Identifier (SID) in the packet, headers corresponding to the first domain from the packet. The edge node may then push, in response to the first SID, a label stack corresponding to the second domain onto the packet. The first SID may include data corresponding to the label stack. Then the edge node may route the packet to the second domain destine to an end node in the second domain.

20 Claims, 5 Drawing Sheets

NETWORK INTERWORKING WITH NO CROSS-DOMAIN STATE

TECHNICAL FIELD

The present disclosure relates generally to the interworking of networks.

BACKGROUND

Multi-Protocol Label Switching (MPLS) is a type of data-carrying technique for high-performance telecommunications networks that directs data from one network node to the next based on short path labels rather than long network addresses, avoiding complex lookups in a routing table. The labels identify virtual links (paths) between distant nodes rather than endpoints. MPLS can encapsulate packets of various network protocols, hence its name "multiprotocol". MPLS supports a range of access technologies, including T1/E1, Asynchronous Transfer Mode (ATM), Frame Relay, and Digital Subscriber Line (DSL).

Internet Protocol (IP) may comprise a communications protocol that provides an identification and location system for computers on networks and routes traffic across the Internet. Internet Protocol version 6 (IPv6) is a version of the Internet Protocol (IP). IPv6 was developed to deal with the problem of Internet Protocol version 4 (IPv4) address exhaustion. IPv6 provides other technical benefits in addition to a larger addressing space. In particular, IPv6 permits hierarchical address allocation processes that facilitate route aggregation across the Internet, and thus limit the expansion of routing tables. The use of multicast addressing is expanded and simplified, and provides additional optimization for the delivery of services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
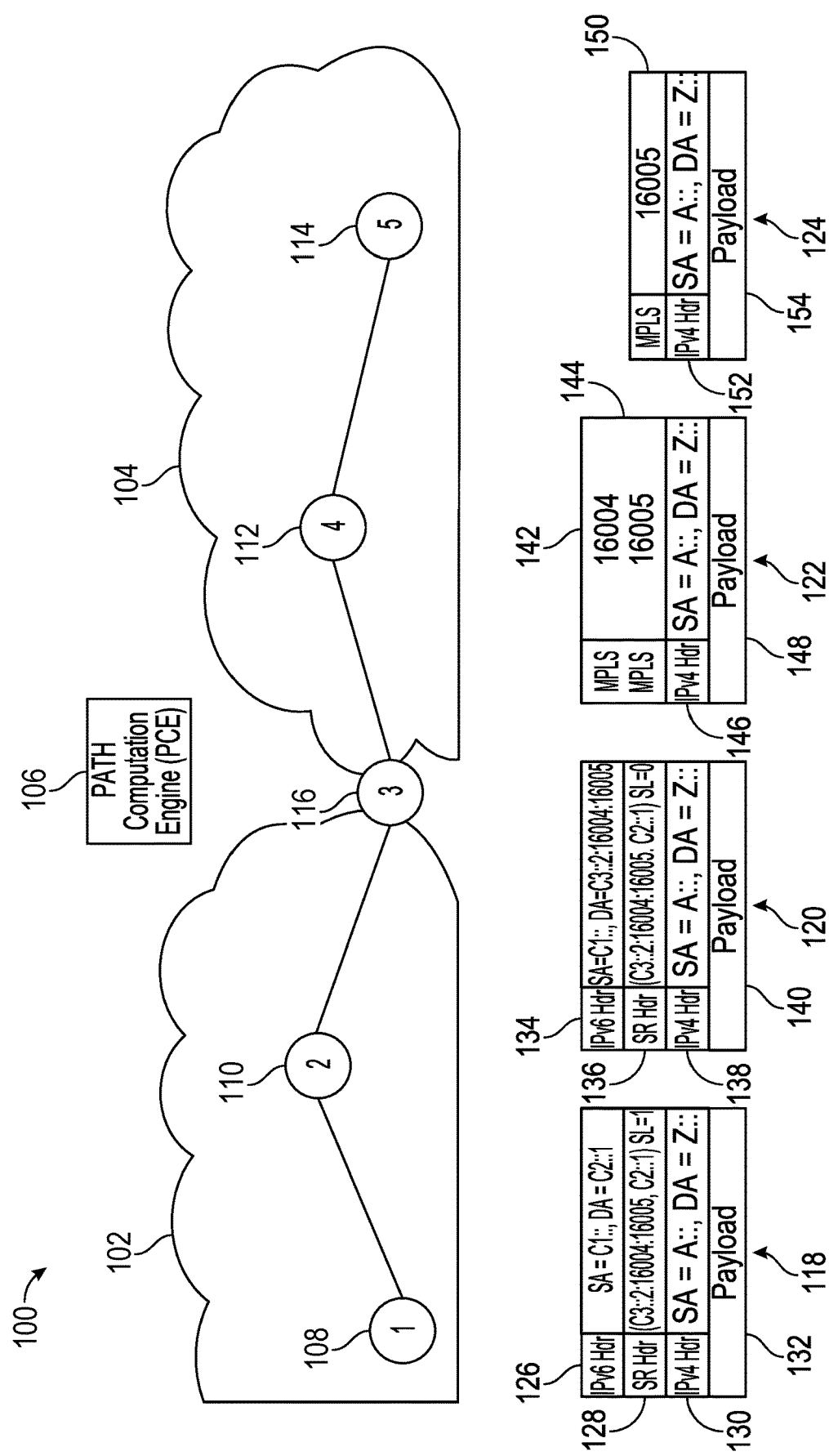
FIG. 1 shows an operating environment for providing network interworking with no cross-domain state.

Network interworking with no cross-domain state may be provided. First, an edge node may receive a packet from an intermediate node in a first domain. The edge node may be between the first domain and a second domain. Next, the edge node may pop, in response to a first Service Identifier (SID) in the packet, headers corresponding to the first domain from the packet. The edge node may then push, in response to the first SID, a label stack corresponding to the second domain onto the packet. The first SID may include data corresponding to the label stack. Then the edge node may route the packet to the second domain destined to an end node in the second domain.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Segment Routing (SR) may be used in computer networking. In a segment routed network, an ingress node may prepend a header to packets that contain a list of segments, which are instructions that are executed on subsequent nodes in the network. These instructions may be forwarding instructions, such as an instruction to forward a packet to a specific destination or interface. SR may work on top of either an MPLS network or on an IPv6 network. In an MPLS network, segments may be encoded as MPLS labels. In IPv6, a header referred to as a Segment Routing Header (SRH) may be used. Segments in the SRH are encoded in a list of IPv6 addresses. SRv6 may be used to refer to a network domain in which SR and IPv6 are used together. SR-MPLS may be used to refer to a network domain in which SR and MPLS are used together.

SRv6 interworking with SR-MPLS may comprise a use case for SRv6 insertion in Service Provider (SP) networks. Embodiments of the disclosure may provide a Software Defined Networking (SDN) process that may allow SPs to deploy SRv6 in an existing network. For example, embodiments of the disclosure may apply to both SRv6-to-SR-MPLS as well as SR-MPLS-to-SRv6 deployment scenarios.

Service providers may wish to grow their existing networks by incrementally deploying SRv6 at an edge of an existing SR-MPLS based network. This may require the network to perform the following interworking functions: i) SRv6-to-SR-MPLS translation; and ii) SR-MPLS-to-SRv6 translation. One way to translate SRv6 to SR-MPLS SIDs and vice-versa may be to stitch SRv6 and SR-MPLS policies using cross-data plane binding Service Identifiers (SIDs). For example, to have an SR policy that crosses SRv6(1), SR-MPLS(2), and SRv6(3) domains, the following may be defined:

An SRv6 policy P1 for domain 1 that ends with an SRv6 binding SID associated with the SR-MPLS policy P2 (End.BM function);

An SR-MPLS policy P2 for domain 2 that ends with an SR-MPLS binding SID associated with the SRv6 policy P3; and An SRv6 policy P3 for domain 3.

With the aforementioned process, the traffic may traverse domain 1 with SRv6 information attached to it, enter domain 2 with an SR-MPLS label stack, and traverse domain 3 with SRv6 again. However, each one of these binding SIDs may have state. This may mean that, for every possible combination of SR policies, there may be a need to have intermediate policies on each domain border. However, having state may be a disadvantage and embodiments of the disclosure, as described below, may translate SRv6 segments to SR-MPLS segments and vice-versa without the need of having state.

FIG. 1 shows an operating environment 100 consistent with embodiments of the disclosure for providing network interworking with no cross-domain state. As shown in FIG. 1, operating environment 100 may comprise a first domain 102, a second domain 104, and Path Computation Engine (PCE) 106. PCE 106 may provide SID lists for routing packets between nodes in operating environment 100 when queried.

First domain 102 may comprise a first domain start node 108 and a first domain intermediate node 110. Second domain 104 may comprise a second domain intermediate node 112 and a second domain end node 114. Operating environment 100 may further comprise an edge node 116 disposed between first domain 102 and second domain 104. First domain start node 108, first domain intermediate node 110, second domain intermediate node 112, second domain end node 114, and edge node 116 may comprise, but are not limited to, routers or switches.

First domain start node 108 and first domain intermediate node 110 may be configured to run a protocol corresponding to the first domain. The protocol corresponding to the first domain may comprise, but is not limited to, SRv6. Second domain intermediate node 112 and second domain end node 114 may be configured to run a protocol corresponding to the second domain. The protocol corresponding to the second domain may comprise, but is not limited to, SR-MPLS. Edge node 116 may be configured to run the protocol corresponding the first domain and the protocol corresponding to the second domain (i.e., edge node 116 may be configured to run both SRv6 and SR-MPLS).

Consistent with embodiments of the disclosure, a packet may be routed in operating environment 100 from first domain start node 108 to second domain end node 114 through first domain intermediate node 110, edge node 116, and second domain intermediate node 112. The packet may comprise a plurality of different states as it passes on links between the aforementioned nodes. For example, the packet may comprise a packet first state 118 between first domain start node 108 and first domain intermediate node 110. The packet may comprise a packet second state 120 between first domain intermediate node 110 and edge node 116. The packet may comprise a packet third state 122 between edge node 116 and second domain intermediate node 112. Furthermore, the packet may comprise a packet fourth state 124 between second domain intermediate node 112 and second domain end node 114.

Packet first state 118 may comprise a first domain header 126, an SR header 128, an alternate domain header 130, and a payload 132. When first domain 102 comprises SRv6, first domain header 126 may comprise an IPv6 header as illustrated in FIG. 1. Alternate domain header 130 may comprise an IPv4 header.

Packet second state 120 may comprise a first domain header 134, an SR header 136, an alternate domain header 138, and a payload 132. When first domain 102 comprises SRv6, first domain header 134 may comprise an IPv6 header as illustrated in FIG. 1. Alternate domain header 138 may comprise an IPv4 header.

Packet third state 122 may comprise a label stack comprising a first second domain label 142 and a second domain label 144, an alternate domain header 146, and a payload 148. When second domain 104 comprises SR-MPLS, first second domain label 142 and second domain label 144 may comprise MPLS labels as illustrated in FIG. 1. Alternate domain header 146 may comprise an IPv4 header.

Packet fourth state 124 may comprise a label stack comprising second second domain label 150, an alternate domain header 152, and a payload 154. When second domain 104 comprises SR-MPLS, second domain label 150 may comprise MPLS labels as illustrated in FIG. 1. Alternate domain header 152 may comprise an IPv4 header. The payload corresponding to the plurality of different packet states may be the same.

The elements described above of operating environment 100 (e.g., first domain start node 108, first domain intermediate node 110, second domain intermediate node 112, second domain end node 114, edge node 116, and PCE 106) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
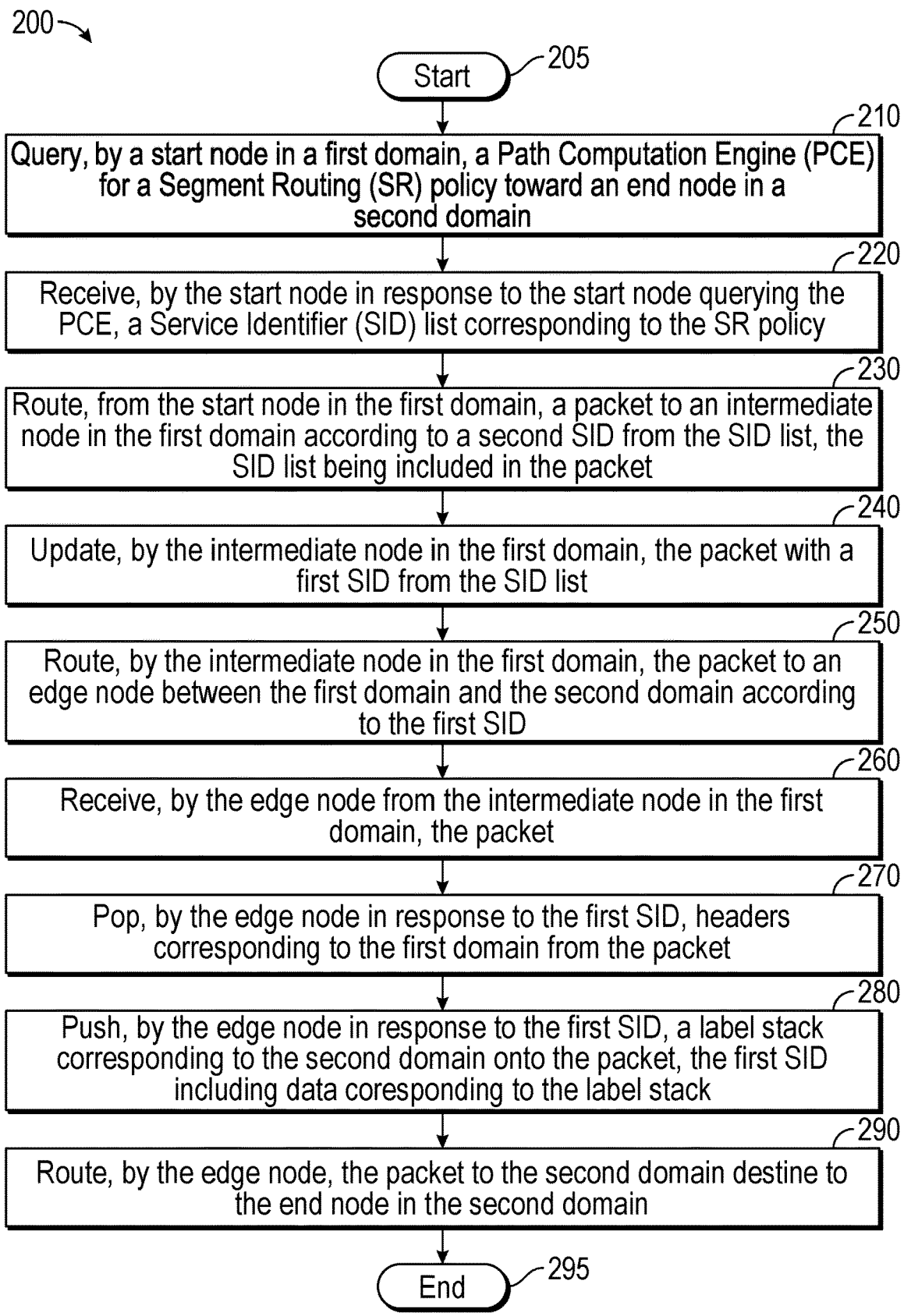
FIG. 2 is a flow chart of a method for providing network interworking with no cross-domain state.

FIG. 2 is a flow chart setting forth the general stages involved in a method 200 consistent with an embodiment of the disclosure for providing network interworking with no cross-domain state. Method 200 may be implemented using operating environment 100 as described in more detail above with respect to FIG. 1. Ways to implement the stages of method 200 will be described in greater detail below.

Method 200 may begin at starting block 205 and proceed to stage 210 where start node 108 in first domain 102 may query PCE 106 for a Segment Routing (SR) policy toward end node 114 in second domain 104. For example, start node 108 may need to route a packet to end node 114 and may ask PCE 106 for a route to end node 114.

From stage 210, where start node 108 in first domain 102 may query PCE 106 for the SR policy toward end node 114 in second domain 104, method 200 may advance to stage 220 where start node 108 may receive, in response to start node 108 querying PCE 106, a Service Identifier (SID) list corresponding to the SR policy. For example, PCE 106 may reply with the SID list comprising: <C2::1, C3::2:16004: 16005>. Within the SID list, C3::2:16004:16005 may comprise a first SID and C2::1 may comprise a second SID.

Once start node 108 receives, in response to querying PCE 106, the SID list corresponding to the SR policy in stage 220, method 200 may continue to stage 230 where start node 108 in first domain 102 may route the packet to intermediate node 110 in first domain 102 according to the second SID from the SID list. The SID list may be included in the packet. For example, the packet may be routed over the shortest path in operating environment 100 towards the second SID, C2::1 where C2 may correspond to intermediate node 110. The packet being routed to intermediate node 110 may comprise packet first state 118 that may comprise first domain header 126 and SR header 128. As shown in FIG. 1, the SID list may be included in SR header 128 in packet first state 118. First domain header 126 may indicate the source address (SA) as C1 (i.e., start node 108) and the destination address (DA) as C2::1 (i.e., intermediate node 110). SL=1 in first domain header 126 may indicate that there may be one more Segment Left (SL) to traverse once the packet in packet first state 118 arrives at its intended destination (i.e., intermediate node 110).

After start node 108 in first domain 102 routes the packet to intermediate node 110 in first domain 102 according to the second SID from the SID list in stage 230, method 200 may proceed to stage 240 where intermediate node 110 in first domain 102 may update the packet with the first SID from the SID list. For example, once the packet arrives at intermediate node 110, the function C2::1 may be executed to update the packet. This function may be associated with the end behavior. The packet updated by this function may comprise packet second state 120 that may comprise first domain header 134 and SR header 136. As shown in FIG. 1, the SID list may be included in SR header 136 in packet second state 120. First domain header 134 may indicate the source address (SA) as C1 (i.e., start node 108) and the destination address (DA) as C3::2:16004:16005 (i.e., edge node 116). SL=0 may indicate that there will be no more Segments Left (SL) to traverse once the packet in packet second state 120 arrives at its intended destination (i.e., edge node 116).

From stage 240, where intermediate node 110 in first domain 102 updates the packet with the first SID from the SID list, method 200 may advance to stage 250 where intermediate node 110 in first domain 102 may route the packet to edge node 116 between first domain 102 and second domain 104 according to the first SID. For example, the packet in packet second state 120 may be routed over the shortest path in first domain 102 up to a node advertising locator C3 (i.e., edge node 116).

Once intermediate node 110 in first domain 102 routes the packet to edge node 116 between first domain 102 and second domain 104 according to the first SID in stage 250, method 200 may continue to stage 260 where edge node 116 may receive the packet. For example, edge node 116 may receive the packet from intermediate node 110 in first domain 102. The received packet may be in packet second state 120.

After edge node 116 receives the packet in stage 260, method 200 may proceed to stage 270 where edge node 116 may pop, in response to the first SID, headers (i.e., first domain header 134 and SR header 136) corresponding to first domain 102 from the packet in packet second state 120. For example, when the packet arrives at edge node 116, the first SID as indicated in the DA of first domain header 134 may be executed. A pop operation may comprise removing an item for example.

As shown in FIG. 1, the first SID may comprise C3::2:16004:16005 for example. An SRv6 SID may have the form LOC:FUN:ARGs, where the Locator (LOC) may comprise a prefix routable up to a given router in the network; the Function (FUN) may comprise the local function that may be executed at such router; and the Arguments (ARGs) may comprise an optional value used to convey arguments specific to that flow to the specific function. In the case of the first SID, the Locator may comprise C3, the Function may comprise 2, and the Arguments may comprise 16004:16005.

Consistent with embodiments of the disclosure, function 2 may comprise an SRv6 function that may be referred to as Endpoint with Programmable Dataplane Interworking (End.PDI). A segment instantiating the End.PDI function may be the last segment in the SRH. This function may take as arguments, an MPLS label stack (i.e., 16004, 16005 for the first SID). Upon function execution, the IPv6 header and all its extension headers (i.e., first domain header 134 and SR header 136) may be removed (i.e. popped), and the MPLS labels carried as SID arguments (i.e., 16004, 16005) may be pushed (i.e., added) into the packet. An example definition of the End.PDI function is as follows:

When N receives a packet destined to S and S is a local End.PDI SID, N does:
1. IF NH=SRH and SL>0
2. drop the packet
3. ELSE
4. set TEMP_STACK=S.arguments
5. pop the (outer) IPv6 header and its extension headers
6. push the MPLS label stack <TEMP_STACK> on the received packet
7. forward according to topmost SR-MPLS label.

From stage 270, where edge node 116 pops, in response to the first SID, headers (i.e., first domain header 134 and SR header 136) corresponding to first domain 102 from the packet in packet second state 120, method 200 may advance to stage 280 where edge node 116 may push, in response to the first SID, a label stack corresponding to second domain 104 onto the packet. A push operation may comprise adding an item for example. The first SID may include data corresponding to the label stack. For example, according to function 2 (e.g., End.PDI), it may be determined if the packet is at an edge node by confirming SL=0, which may indicate that there will be no more Segments Left (SL) to traverse once the packet in packet second state 120 arrives at edge node 116. Then edge node 116 may store the SR-MPLS label stack <16004, 16005> (i.e., line 4 of End.PDI described above). The IPv6 header and its extension headers (i.e., first domain header 134 and SR header 136) may be popped (i.e. line 5 of End.PDI described above). Then the MPLS label stack <16004, 16005> may be pushed into the packet (i.e. line 6 of End.PDI described above). This now places the packet into packet third state 122 with the MPLS label stack comprising first second domain label 142 (i.e., 16004) and second domain label 144 (i.e., 16005) as shown in FIG. 1.

After edge node 116 pushes, in response to the first SID, the label stack corresponding to second domain 104 onto the packet in stage 280, method 200 may proceed to stage 290 where edge node 116 may route the packet to second domain 104 destined to end node 114 in second domain 104. For example, the packet may be routed over second domain 104 (e.g., SR-MPLS) through the set of segments listed in the label stack until the packet in packet fourth state 124 arrives at end node 114 in second domain 104. Once edge node 116 routes the packet to second domain 104 destined to end node 114 in second domain 104 in stage 290, method 200 may then end at stage 295.

Figure 3:
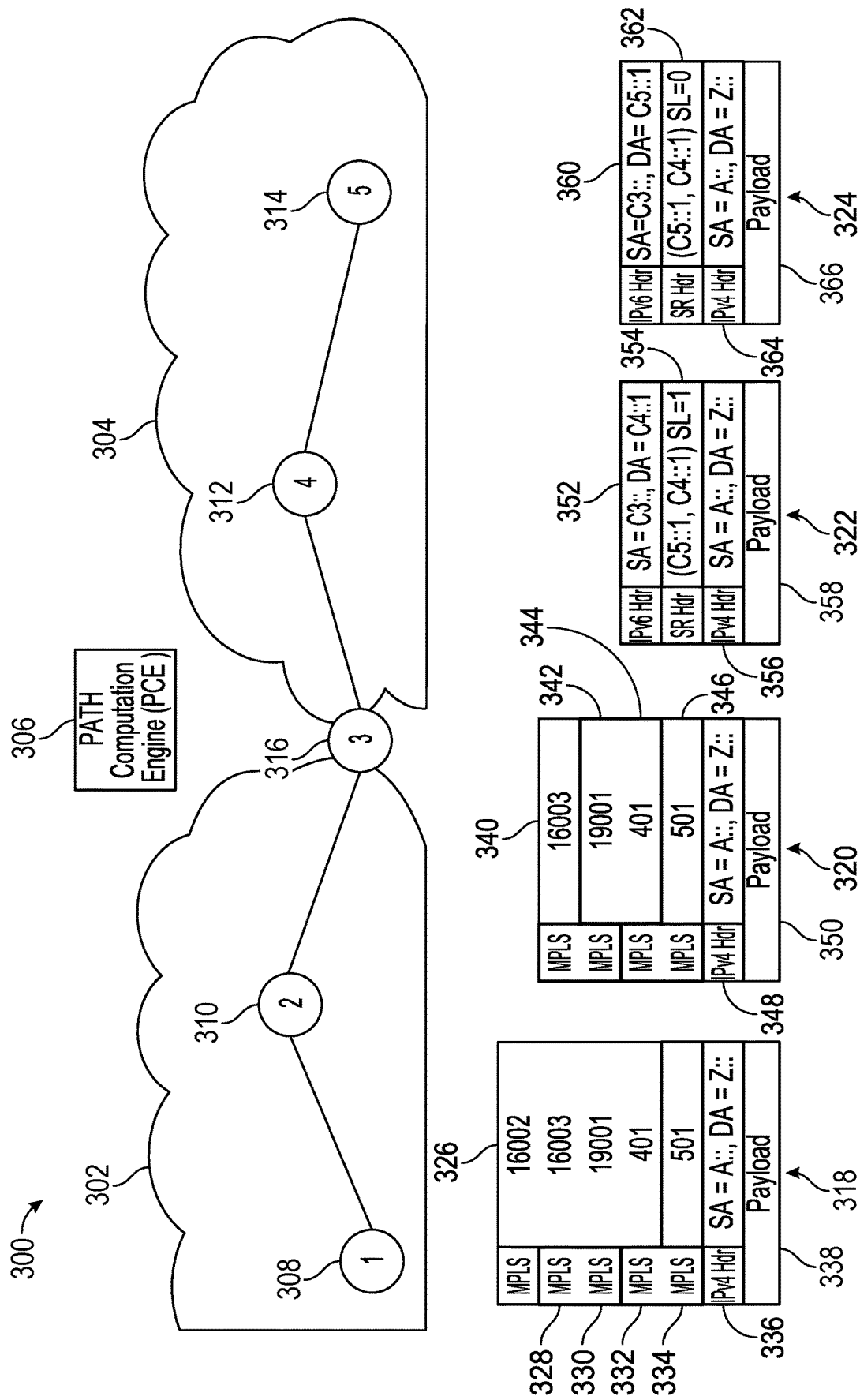
FIG. 3 shows an operating environment for providing network interworking with no cross-domain state.

FIG. 3 shows an operating environment 300 consistent with embodiments of the disclosure for providing network interworking with no cross-domain state. As shown in FIG. 3, operating environment 300 may comprise a first domain 302, a second domain 304, and Path Computation Engine (PCE) 306. PCE 306 may provide SID lists for routing packets between nodes in operating environment 300 when queried.

First domain 302 may comprise a first domain start node 308 and a first domain intermediate node 310. Second domain 304 may comprise a second domain intermediate node 312 and a second domain end node 314. Operating environment 300 may further comprise an edge node 316 disposed between first domain 302 and second domain 304. First domain start node 308, first domain intermediate node 310, second domain intermediate node 312, second domain end node 314, and edge node 316 may comprise, but are not limited to, routers or switches.

First domain start node 308 and first domain intermediate node 310 may be configured to run a protocol corresponding to the first domain. The protocol corresponding to the first domain may comprise, but is not limited to, SR-MPLS. Second domain intermediate node 312 and second domain end node 314 may be configured to run a protocol corresponding to the second domain. The protocol corresponding to the second domain may comprise, but is not limited to, SRv6. Edge node 316 may be configured to run the protocol corresponding the first domain and the protocol corresponding to the second domain (i.e., edge node 316 may be configured to run both SRv6 and SR-MPLS).

Consistent with embodiments of the disclosure, a packet may be routed in operating environment 300 from first domain start node 308 to second domain end node 314 through first domain intermediate node 310, edge node 316, and second domain intermediate node 312. The packet may comprise a plurality of different states as it passes on links between the aforementioned nodes. For example, the packet may comprise a packet first state 318 between first domain start node 308 and first domain intermediate node 310. The packet may comprise a packet second state 320 between first domain intermediate node 310 and edge node 316. The packet may comprise a packet third state 322 between edge node 316 and second domain intermediate node 312. Furthermore, the packet may comprise a packet fourth state 324 between second domain intermediate node 312 and second domain end node 314.

Packet first state 318 may comprise a label stack comprising a first domain label 326, a second first domain label 328, a third first domain label 330, a fourth first domain label 332, and a fifth first domain label 334. Packet first state 318 may further comprise an alternate domain header 336 and a payload 338. When first 302 domain comprises SR-MPLS, first domain label 326, second first domain label 328, third first domain label 330, fourth first domain label 332, and fifth first domain label 334 may comprise MPLS labels as illustrated in FIG. 3. Alternate domain header 336 may comprise an IPv4 header.

Packet second state 320 may comprise a label stack comprising a first first domain label 340, a second first domain label 342, a third first domain label 344, and a fourth first domain label 346. Packet second state 320 may further comprise an alternate domain header 348 and a payload 350. When first domain 302 comprises SR-MPLS, first domain label 340, second first domain label 342, third first domain label 344, and fourth first domain label 346 may comprise MPLS labels as illustrated in FIG. 3. Alternate domain header 348 may comprise an IPv4 header.

Packet third state 322 may comprise a second domain header 352, an SR header 354, an alternate domain header 356, and a payload 358. When second domain 304 comprises SRv6, second domain header 352 may comprise an IPv6 header as illustrated in FIG. 3. Alternate domain header 138 may comprise an IPv4 header.

Packet fourth state 324 may comprise a second domain header 360, an SR header 362, an alternate domain header 364, and a payload 336. When second domain 304 comprises SRv6, second domain header 360 may comprise an IPv6 header as illustrated in FIG. 3. Alternate domain header 364 may comprise an IPv4 header.

The elements described above of operating environment 100 (e.g., first domain start node 308, first domain intermediate node 310, second domain intermediate node 312, second domain end node 314, edge node 316, and PCE 306) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 300 may be practiced in a computing device 500.

Figure 4:
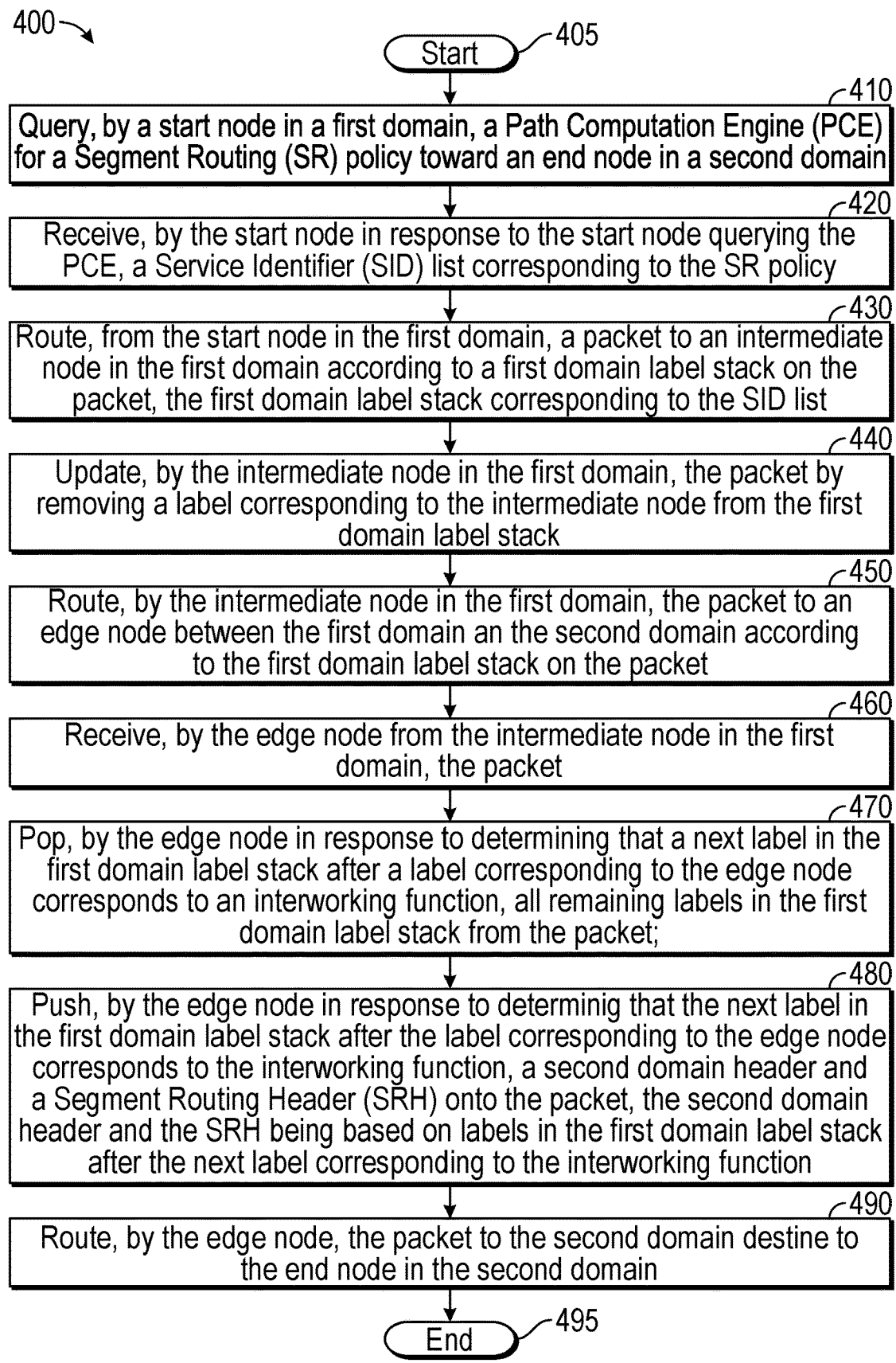
FIG. 4 is a flow chart of a method for providing network interworking with no cross-domain state.

FIG. 4 is a flow chart setting forth the general stages involved in a method 400 consistent with an embodiment of the disclosure for providing network interworking with no cross-domain state. Method 400 may be implemented using operating environment 300 as described in more detail above with respect to FIG. 3. Ways to implement the stages of method 400 will be described in greater detail below.

Method 400 may begin at starting block 405 and proceed to stage 410 where start node 308 in first domain 302 may query PCE 306 for a Segment Routing (SR) policy toward end node 314 in second domain 304. For example, start node 308 may need to route a packet to end node 314 and may ask PCE 306 for a route to end node 314.

From stage 410, where start node 308 in first domain 302 may query PCE 306 for the SR policy toward end node 314 in second domain 304, method 400 may advance to stage 420 where start node 308 may receive, in response to start node 308 querying PCE 306, a Service Identifier (SID) list corresponding to the SR policy. For example, PCE 106 may reply with the SID list comprising <16002, 16003, 19001, 401, 501>.

Once start node 308 receives, in response to start node 308 querying PCE 306, the SID list corresponding to the SR policy in stage 420, method 400 may continue to stage 430 where start node 308 in first domain 302 may route the packet to intermediate node 310 in first domain 302 according to a first domain label stack on the packet. The first domain label stack may correspond to the SID list. For example, the packet routed from start node 308 to intermediate node 310 may comprise packet first state 318. The first domain label stack of packet first state 318 may comprise first domain label 326 (e.g., 16002), second first domain label 328 (e.g., 16003), third first domain label 330 (e.g., 19001), fourth first domain label 332 (e.g., 401), and fifth first domain label 334 (e.g., 501). First domain label 326 and second first domain label 328 may respectively correspond to first domain intermediate node 310 and edged node 316. Fourth first domain label 332 and fifth first domain label 334 may respectively correspond to second domain intermediate node 312 and second domain end node 314. As will be described in greater detail below, third first domain label 330 may correspond to an interworking function consistent with embodiments of the disclosure.

After start node 308 in first domain 302 routes the packet to intermediate node 310 in first domain 302 according to the first domain label stack on the packet in stage 430, method 400 may proceed to stage 440 where intermediate node 310 in first domain 302 may update the packet by removing a label (i.e., first domain label 326) corresponding to intermediate node 310 from the first domain label stack. For example, the updated packet may comprise packet second state 320. As shown in FIG. 1, packet second state 320 may comprise a label stack comprising a first domain label 340 (e.g., 16003 corresponding to edge node 316), a second first domain label 342 (e.g., 1900 corresponding to the interworking function), a third first domain label 344 (e.g., 401 corresponding to second domain intermediate node 312), and a fourth first domain label 346 (e.g., 501 corresponding to second domain end node 314).

From stage 440, where intermediate node 310 in first domain 302 updates the packet by removing the label corresponding to intermediate node 310 from the first domain label stack, method 400 may advance to stage 450 where intermediate node 310 in first domain 302 may route the packet to edge node 316 between first domain 302 and second domain 304 according to the first domain label stack on the packet. For example, the packet in packet second state 320 may be routed over the shortest path in first domain 302 up to a node corresponding to first domain label 340 (e.g., 16003 corresponding to edge node 316).

Once intermediate node 310 in first domain 302 routes the packet to edge node 316 between first domain 302 and second domain 304 according to the first domain label stack on the packet in stage 450, method 400 may continue to stage 460 where edge node 316 may receive, from intermediate node 316 in first domain 304, the packet. For example, edge node 316 may receive the packet from intermediate node 310 in first domain 302. The received packet may be in packet second state 320.

After edge node 316 receives, from intermediate node 316 in first domain 304, the packet in stage 460, method 400 may proceed to stage 470 where edge node 316 may pop, in response to determining that a next label (i.e., second first domain label 342) in the first domain label stack after a label (i.e., first domain label 340) corresponding to edge node 316 corresponds to an interworking function, all remaining labels in the first domain label stack from the packet. For example, once the packet reaches edge node 316, the local segment 19001 may be associated with the interworking function that may translate the first domain 302 (e.g., SR-MPLS) traffic into second domain 304 (e.g., SRv6) SIDs. The executed interworking function may remove (i.e., pops) the first domain label stack from the packet second state 320.

The interworking function (e.g., the SR-MPLS interworking function) may work to an SRv6 domain in a similar fashion as the End.PDI function described above. SR-MPLS local segments may be bounded with the interworking function. The subsequent labels in the label stack until End-of-Stack (EoS) may comprise SRv6 segments.

An SRv6 SID may comprise 128-bits while an MPLS label may comprise 20-bits. However, it may already be known that all the SRv6 SIDs from the same domain may share the initial part of the Locator because all of them may come from the SP prefix block. A Locator may be divided in between SP_prefix and NodeID. Accordingly, the necessary amount of NodeIDs and functions necessary in that limited domain may be encode in 20-bits. However, two MPLS labels per SRv6 SID may be used to provide 40-bits for the NodeID+Function information.

From stage 470, where edge node 316 pops, in response to determining that the next label in the first domain label stack after the label corresponding to the edge node corresponds to the interworking function, all remaining labels in the first domain label stack from the packet, method 400 may advance to stage 480 where edge node 316 may push, in response to determining that the next label in the first domain label stack after the label corresponding to edge node 316 corresponds to the interworking function, a second domain header and a Segment Routing Header (SRH) onto the packet. The second domain header and the SRH may be based on labels in the first domain label stack after the next label corresponding to the interworking function. For example, the function 19001 may be pre-configured with an SP Prefix of C::/64. Hence, the following segments in the label stack <401, 501> may be translated into <C4::1, C5::1>. Edge node 316 may pop the first domain label stack and insert second domain header 352 (e.g., an IPv6 header) and SR header 354 with the corresponding SIDs <C4::1, C5::1> to create packet third state 322 for example.

After edge node 316 pushes second domain header 352 and SR header 354 onto the packet in stage 480, method 400 may proceed to stage 490 where edge node 316 may route the packet to second domain 304 destined to end node 314 in second domain 304. For example, the packet may be routed over second domain 304 (e.g., SRv6) via SR until the packet in packet fourth state 324 arrives at end node 314 in second domain 304. Once edge node 316 routes the packet to second domain 304 destined to end node 314 in second domain 304 in stage 490, method 400 may then end at stage 495.

Figure 5:
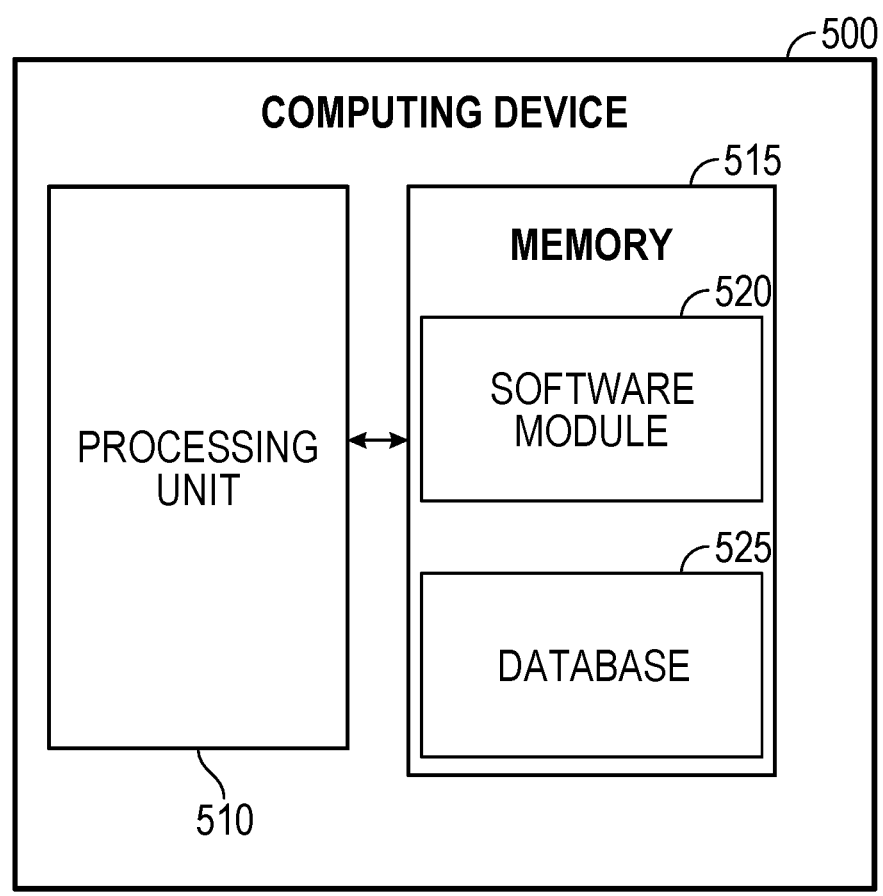
FIG. 5 shows a computing device.

FIG. 5 shows a computing device 500. As shown in FIG. 5, computing device 500 may include a processing unit 510 and a memory unit 515. Memory unit 515 may include a software module 520 and a database 525. While executing on processing unit 510, software module 520 may perform processes for providing network interworking with no cross-domain state, including for example, any one or more of the stages from method 200 described above with respect to FIG. 2 and any one or more of the stages from method 400 described above with respect to FIG. 4. Computing device 500, for example, may provide an operating environment for first domain start node 108, first domain intermediate node 110, second domain intermediate node 112, second domain end node 114, edge node 116, PCE 106, first domain start node 308, first domain intermediate node 310, second domain intermediate node 312, second domain end node 314, edge node 316, and PCE 306. First domain start node 108, first domain intermediate node 110, second domain intermediate node 112, second domain end node 114, edge node 116, PCE 106, first domain start node 308, first domain intermediate node 310, second domain intermediate node 312, second domain end node 314, edge node 316, and PCE 306 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by an edge node from an intermediate node in a first domain, a packet, the edge node being between the first domain and a second domain;
   popping, by the edge node in response to a first Service Identifier (SID) in the packet, headers corresponding to the first domain from the packet, wherein popping the headers corresponding to the first domain from the packet comprises popping the headers corresponding a first protocol associated with the first domain from the packet;
   pushing, by the edge node in response to the first SID, a label stack corresponding to the second domain onto the packet, the first SID including data corresponding to the label stack, wherein pushing the label stack corresponding to the second domain onto the packet comprises pushing the label stack corresponding a second protocol associated with the second domain onto the packet, the second protocol being different from the first protocol, the edge node being operative to run both the first protocol associated with the first domain and the second protocol associated with the second domain; and
   routing, by the edge node, the packet to the second domain destined to an end node in the second domain.

2. The method of claim 1, further comprising routing, by the intermediate node in the first domain, the packet to the edge node between the first domain and the second domain according to the first SID.

3. The method of claim 2, further comprising updating, by the intermediate node in the first domain, the packet with the first SID from an SID list.

4. The method of claim 3, further comprising routing, from a start node in the first domain, the packet to the intermediate node in the first domain according to a second SID from the SID list, the SID list being included in the packet.

5. The method of claim 4, further comprising:
    querying, by the start node in the first domain, a Path Computation Engine (PCE) for a Segment Routing (SR) policy toward the end node in the second domain; and
    receiving, by the start node in response to the start node querying the PCE, the SID list corresponding to the SR policy.

6. The method of claim 1, wherein the first domain comprises a Segment Routing (SR) Internet Protocol version 6 (SRv6) domain.

7. The method of claim 1, wherein the second domain comprises an SR Multi-Protocol Label Switching (SR-MPLS) domain.

8. A method comprising:
    receiving, by an edge node from an intermediate node in a first domain, a packet, the edge node being between the first domain and a second domain;
    popping, by the edge node in response to determining that a next label in a first domain label stack after a label corresponding to the edge node corresponds to an interworking function, all remaining labels in the first domain label stack from the packet, wherein popping the all remaining labels in the first domain label stack from the packet comprises popping the all remaining labels of a first protocol in the first domain label stack from the packet;
    pushing, by the edge node in response to determining that the next label in the first domain label stack after the label corresponding to the edge node corresponds to the interworking function, a second domain header and a Segment Routing Header (SRH) onto the packet, the second domain header and the SRH being based on labels in the first domain label stack after the next label corresponding to the interworking function, wherein pushing the second domain header and the SRH onto the packet comprises pushing the second domain header and the SRH corresponding a second protocol associated with the second domain onto the packet, the second protocol being different from the first protocol, the edge node being operative to run both the first protocol associated with the first domain and the second protocol associated with the second domain; and
    routing, by the edge node, the packet to the second domain destined to an end node in the second domain.

9. The method of claim 8, further comprising routing, by the intermediate node in the first domain, the packet to the edge node between the first domain and the second domain according to the first domain label stack on the packet.

10. The method of claim 9, further comprising updating, by the intermediate node in the first domain, the packet by removing a label corresponding to the intermediate node from the first domain label stack.

11. The method of claim 10, further comprising routing, from the start node in the first domain, the packet to the intermediate node in the first domain according to the first domain label stack on the packet, the first domain label stack corresponding to a Service Identifier (SID) list.

12. The method of claim 11, further comprising:
    querying, by the start node in the first domain, a Path Computation Engine (PCE) for a Segment Routing (SR) policy toward the end node in the second domain; and
    receiving, by the start node in response to the start node querying the PCE, the SID list corresponding to the SR policy.

13. The method of claim 8, wherein the first domain comprises a Segment Routing (SR) Multi-Protocol Label Switching (SR-MPLS) domain.

14. The method of claim 8, wherein the second domain comprises an SR Internet Protocol version 6 (SRv6) domain.

15. An apparatus comprising:
    a memory storage disposed in an edge node; and
    a processing unit disposed in the edge node and coupled to the memory storage, wherein the processing unit is operative to:
        receive, from an intermediate node in a first domain, a packet, the edge node being between the first domain and a second domain,
        pop, in response to a first Service Identifier (SID) in the packet, headers corresponding to the first domain from the packet, wherein the processing unit being operative to pop the headers corresponding to the first domain from the packet comprises the processing unit being operative to pop the headers corresponding a first protocol associated with the first domain from the packet, and
        push, in response to the first SID, a label stack corresponding to the second domain onto the packet, the first SID including the label stack, wherein the processing unit being operative to push the label stack corresponding to the second domain onto the packet comprises the processing unit being operative to push the label stack corresponding a second protocol associated with the second domain onto the packet, the second protocol being different from the first protocol, the edge node being operative to run both the first protocol associated with the first domain and the second protocol associated with the second domain.

16. The apparatus of claim 15, wherein the processing unit is further operative to route the packet to the second domain destined to an end node in the second domain.

17. The apparatus of claim 15, wherein the apparatus comprises a router.

18. The apparatus of claim 17, wherein the router is configured to run the first protocol corresponding the first domain and the second protocol corresponding to the second domain.

19. The apparatus of claim 15, wherein the first domain comprises a Segment Routing (SR) Internet Protocol version 6 (SRv6) domain.

20. The apparatus of claim 15, wherein the second domain comprises an SR Multi-Protocol Label Switching (SR-MPLS) domain.

* * * * *